United States Patent Office 3,118,894
Patented Jan. 21, 1964

3,118,894
PROCESS FOR THE PREPARATION OF LOWER ALKYL 18 - DEOXY - 18 - FLUORORESERPATES AND RELATED COMPOUNDS
Donald E. Ayer, Portage Township, Kalamazoo County, Mich., assignor to The Upjohn Company, Kalamazoo, Mich., a corporation of Delaware
No Drawing. Filed Apr. 19, 1962, Ser. No. 188,848
4 Claims. (Cl. 260—287)

This invention pertains to novel chemical compounds and a novel process for preparing the same. More particularly, the invention is directed to lower-alkyl 18-deoxy - 18 - fluororeserpates and lower-alkyl 18-deoxy-18-fluorodeserpidates, and to a novel process for replacing the 18-hydroxyl group of lower-alkyl reserpates and deserpidates with fluorine using a tertiary amine fluorinating agent.

The novel free base compounds of this invention have the following structural formula:

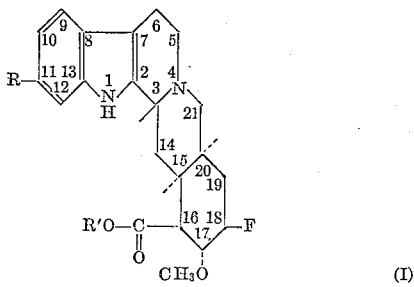

wherein R is selected from the group consisting of hydrogen and methoxy and R' is lower-alkyl of from 1 to 8 carbon atoms, inclusive. The compounds of this invention include pharmacologically acceptable acid addition salts of the foregoing free base compounds.

The novel lower-alkyl 18-deoxy-18-fluororeserpates and lower-alkyl 18-deoxy-18-fluorodeserpidates of this invention and their acid addition salts are useful for inducing sedation in animals and humans. They are particularly advantageous for that purpose, because, unlike reserpine, they are substantially devoid of objectionable hypotensive action. Thus, the objectionable effects of reserpine on the cardiovascular system and the adrenal-pituitary complex are significantly reduced by the novel compounds of this invention. Other undesirable side effects of reserpine are likewise substantially attenuated.

It has now been found in accordance with the invention that the 18-hydroxyl group of lower-alkyl reserpates and deserpidates can be replaced with fluorine by reaction with a fluorinating agent having the formula

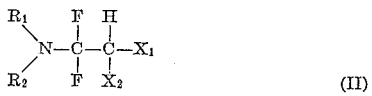

wherein $X_1$ is selected from the class consisting of chlorine and fluorine, $X_2$ is selected from the class consisting of chlorine, fluorine and trifluoromethyl, $R_1$ and $R_2$ taken individually represent lower-alkyl, and $R_1$ and $R_2$ taken together with —N< constitute a saturated heterocyclic radical containing from 5 to 7 ring atoms, inclusive, one of which, in addition to the amino nitrogen, is selected from the group consisting of carbon, nitrogen, oxygen, and sulfur, the other ring atoms being carbon, in an inert organic solvent, whereby the 18-hydroxyl group of the lower-alkyl reserpate and deserpidate starting material (in the form of an acid addition salt) is replaced by fluorine.

The term "lower-alkyl" means an alkyl radical containing from 1 to 8 carbon atoms, inclusive, such as methyl, ethyl, propyl, butyl, amyl, hexyl, heptyl, octyl, and isomeric forms thereof. The term "saturated heterocyclic radical containing from 5 to 7 ring atoms, inclusive" includes pyrrolidino, 2-methylpyrrolidino, 2,2-dimethylpyrrolidino, and like alkylpyrrolidino groups, 4-methylpiperazino, 2,4-dimethylpiperazino, and like alkylpiperazino groups, morpholino, thiamorpholino, piperidino, 2-methylpiperidino, 3-methylpiperidino, and like alkylpiperidino groups, hexamethyleneimino, 2-methylhexamethyleneimino, homomorpholino, and the like.

Examples of fluorinating agents having the Formula II are N-(2-chloro-1,1,2-trifluoroethyl)diethylamine, N-(1,1,2,2 - tetrafluoroethyl)diethylamine, N-(2-chloro-1,1,2-trifluoroethyl)dimethylamine, N-(2-chloro-1,1,2-trifluoroethyl) diisobutylamine, N-(2-chloro-1,1,2-trifluoroethyl)-dioctylamine, N - (2-chloro-1,1,2-trifluoroethyl)methylethylamine, N - (2,2-dichloro-1,1-difluoroethyl)diethylamine, N-1,1,2,3,3,3-hexafluoropropyl)diethylamine, N-(1,1,2,2-tetrafluoroethyl)diisopropylamine, and the like. The preferred fluorinating agent for use in the process of the invention is N-(2-chloro-1,1,2-trifluoroethyl)diethylamine.

The term "inert organic solvent" means any organic solvent which does not react with the fluorinating agent and in which the lower-alkyl reserpate and deserpidate starting materials (i.e., acid addition salts) are appreciably soluble such as aromatic and aliphatic hydrocarbons, halogenated hydrocarbons, esters, ketones, ethers, and tertiary alcohols. Examples of such solvents are benzene, toluene, chlorobenzene, pentane, hexane, cyclohexane, ethyl acetate, butyl acetate, acetone, methyl ethyl ketone, tetrahydrofuran, ethyl ether, tert-butyl alcohol, tert-amyl alcohol, methylene chloride, chloroform, carbon tetrachloride, ethylene dichloride, ethylidene chloride, propylene chloride, trimethylene chloride, and the like.

The process of the invention is carried out in the presence of an acid. The acid is present in excess of the amount required to neutralize the tertiary amino group of the lower-alkyl reserpate or deserpidate starting material, the excess acid serving as catalyst. Conveniently, the excess acid initially present in the reaction mixture is of the order of about 0.1 to about 25 percent of the starting material on a mole-equivalent basis. Acids suitable for these purposes include proton-forming acids such as the hydrogen halides, phosphoric acid, sulfuric acid, and the like or Lewis acids (see Fieser and Fieser, "Organic Chemistry," third edition, page 138, Reinhold, 1956), such as boron trifluoride, boron trichloride, aluminum trifluoride, arsenic trifluoride, phosphorus pentafluoride, titanium tetrafluoride, and the like. The preferred acids are the hydrogen halides, particularly hydrogen fluoride. In the case of hydrogen fluoride, the acid can be added to the reaction mixture or can be generated in situ in the manner described hereinafter.

The process of the invention is carried out conveniently by bringing together the lower-alkyl reserpate or deserpidate starting material, the fluorinating agent, and the acid catalyst, in the presence of an inert organic solvent. The temperature at which the reaction is carried out can range from about —40° C. to about 50° C. However, a preferred temperature range is between about 0° C. and about 30° C. The desired lower-alkyl 18-deoxy-18-fluororeserpate or lower-alkyl 18-deoxy-18-fluorodeserpidate is recovered from the reaction mixture and purified by conventional procedures, for example, basification and solvent extraction of the reaction mixture followed by removal of the solvent and recrystallization. If desired the product can be purified by chromatographic procedures.

Advantageously, the fluorinating agent having the Formula II above is employed in excess of the stoichiometric quantity based on the starting reserpate or deserpidate. Preferably, it is present to the extent of about 1.1 to 10 moles per mole of the reserpate or deserpidate.

When the acid employed in the process of the invention is hydrogen fluoride, the latter can be added to the reaction mixture as such or can be generated in situ, for example, by addition of the requisite quantity of water or a lower alkanol such as methanol, ethanol, and the like, to produce the desired quantity of hydrogen fluoride by reaction with the fluorinating agent as follows:

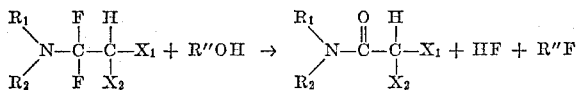

wherein R″ represents hydrogen, methyl, ethyl and other lower-alkyl. Preferably, the inert organic solvent is a halogenated hydrocarbon of the kind illustrated above.

In many instances the yield of lower-alkyl 18-deoxy-18-fluororeserpate or 18-deoxy-18-fluorodeserpidate obtained in the process of the invention can be increased significantly by the incorporation in the reaction mixture of a tertiary amine hydrofluoride. Tertiary amine hydrofluorides which can be employed for this purpose are those having the formula $R_3R_4R_5N \cdot HF$ wherein $R_3$, $R_4$, and $R_5$ are selected from the class consisting of lower-alkyl, as hereinbefore defined, and aralkyl from 7 to 13 carbon atoms, inclusive, and $R_3$ and $R_4$ taken together with $-N<$ constitute a saturated heterocyclic radical containing from 5 to 7 ring atoms, inclusive, as hereinbefore defined.

The term "aralkyl" means an aralkyl group containing from 7 to 13 carbon atoms, inclusive, such as benzyl, phenethyl, phenylpropyl, benzhydryl, and the like.

Examples of tertiary amine hydrofluorides having the formula $R_3R_4R_5N \cdot HF$ are the hydrofluorides of trimethylamine, triethylamine, tripropylamine, tributylamine, triisobutylamine, trioctylamine, diethylbenzylamine, methyldiethylamine, propyldimethylamine, N-methylpyrrolidine, N,2,2 - trimethylpyrrolidine, N-methylpiperidine, N,2-dimethylpiperidine, N,N′-dimethylpiperazine, N,N′-diethylpiperazine, N-methylmorpholine, N-ethylmorpholine, and the like.

Advantageously, the tertiary amine hydrofluorides, when employed in the process of the invention, are present in a proportion within the range of about 1 mole to about 20 moles per mole of the lower-alkyl reserpate or lower-alkyl deserpidate starting material.

The lower-alkyl reserpate and deserpidate starting materials are readily prepared by known methods. Illustratively, lower-alkyl reserpates are prepared by reacting reserpic acid with an esterifying agent which will react with the carboxyl group to form an ester thereof, e.g., in accordance with the procedure described in U.S. Patent 2,824,874. Suitable esterifying agents include diazoalkanes, for example, diazomethane, diazoethane, diazobutane, diazooctane, and the like, and alkanols, for example, methanol, ethanol, propanol, butanol, pentanol, hexanol, haptanol, octanol, and the like. The reaction with an alkanol is carried out in the presence of an acid catalyst such as sulfuric acid, p-toluenesulfonic acid, a hydrohalic acid, for example, hydrochloric acid, and the like. Likewise, lower-alkyl deserpidate starting materials are prepared by reaction of deserpidic acid with a diazoalkane, examples of which are given above, or by alcoholysis of the lactone of deserpidic acid in accordance with the procedure described in U.S. Patent 2,995,556, utilizing an alkanol such as those exemplified above.

The acid addition salts of the invention comprise the salts of lower-alkyl 18-deoxy-18-fluororeserpates and lower-alkyl 18-deoxy-18-fluorodeserpidates having the structural Formula I with acids. The acid addition salts can be prepared by conventional methods. For example, a lower-alkyl 18-deoxy-18-fluororeserpate can be treated with at least a stoichiometric amount of the appropriate acid; and depending upon the nature of the solvent employed, the desired salt will separate spontaneously or can be precipitated by the addition of a solvent in which the salt is insoluble. Acid addition salts can also be prepared metathetically by reacting a lower-alkyl 18-deoxy-18-fluororeserpate acid addition salt with an acid which is stronger than the acid comprising the acid moiety of the starting salt. A pharmacologically acceptable acid addition salt can be prepared using acids such as sulfuric, hydrochloric, hydrobromic, nitric, phosphoric, benzoic, p-toluenesulfonic, salicylic, acetic, propionic, lactic, pamoic, tartaric, citric, succinic, and like pharmacologically acceptable acids.

The compounds having Formula I above and the acid addition salts of this invention can be formulated in compositions for oral and parenteral administration in the same manner as the Rauwolfia alkaloids, e.g., reserpine.

For oral administration, the compounds having Formula I or their acid addition salts can be formulated with a pharmaceutical carrier to give solid or fluid unit dosage forms, such as tablets, capsules, powders, granules, solutions, syrups, elixirs, and the like. Illustratively, tablets are prepared from a powder mixture by granulating, adding a lubricant, and forming in a die. Likewise, for example, a syrup is prepared by dispersing a lower-alkyl 18-deoxy-18-fluororeserpate or lower-alkyl 18-deoxy-18-fluorodeserpidate according to Formula I or an acid addition salt thereof in a suitably flavored aqueous sucrose solution.

For parenteral administration, the compounds having Formula I or their acid addition salts, can be formulated in dilute aqueous solutions, aqueous suspensions, and oil dispersions for intramuscular injection, intravenous drip, vascular perfusion, or like routes. If desired, aqueous media such as water for injection, sterile glucose solution, normal saline solution, glucose-saline solution, Ringer's solution, and the like can be used. If desired, a measured amount of powdered compound according to Formula I or an acid addition salt is placed in a vial and the vial and its contents sterilized and sealed. An accompanying vial of sterile water for injection is provided as a vehicle to form a solution or suspension prior to administration.

The composition described hereinbefore can include analgetic agents such as morphine, codeine, 3-p-chlorophenoxy-2-hydroxypropyl carbamate, prostigmine methylsulfate, aspirin, acetophenetidin, salicylamide, and N-acetyl-p-aminophenol; hypnotic agents such as the barbiturates and chloral hydrate; steroids such as hydrocortisone, prednisolone, methylprednisolone, and 6α-fluoroprednisolone; muscle relaxants such as chlorzoxazone, carisoprodol, mephenesin, meprobamate, phenaglycodol, and zoxazolamine; and antihistamines such as chlorpheniramine maleate, thenylpyramine fumarate, prophenpyridamine, and pyrilamine.

The amount to be administered varies, of course, with many well-known factors, e.g., age, weight, condition, route, and the like. However, a suitable dosage on a body-weight basis for animals and humans is about 0.05 mg. to about 15 mg. per day.

The following examples describe some preferred forms and practices of this invention, but they are not to be construed as limiting the scope thereof.

PREPARATION 1

*N-(2-Chloro-1,1,2-Trifluoroethyl)Diethylamine*

A total of 15 ml. of trifluorochloroethylene was condensed in a pressure tube cooled in an acetone-Dry Ice (solid carbon dioxide) bath. To the pressure tube was added 10.3 ml. of diethylamine previously cooled to —40° C. and the tube was then sealed, placed in an ice bath, and allowed to warm slowly to room temperature. The tube and contents were then allowed to stand for 48 hr. at room temperature before cooling the tube, opening the latter and distilling the contents under reduced pressure with minimum exposure to atmospheric moisture. There was thus obtained 15.7 g. (85% yield) of N-(2-chloro-1,1,2-trifluoroethyl)diethylamine in the form of a liquid having a boiling point of 33° to 34° C. at a pressure of 6 mm. of mercury.

Using the above procedure, but replacing diethylamine by dimethylamine, diisopropylamine, dibutylamine, pyrrolidine, 2-methylpyrrolidine, 2,2-dimethylpyrrolidine, 4-methylpiperazine, morpholine, piperidine, and 2-methylpiperidine, there are obtained N-(2-chloro-1,1,2-trifluoroethyl)dimethylamine, N-(2-chloro-1,1,2-trifluoroethyl)diisopropylamine, N-(2-chloro-1,1,2-trifluoroethyl)dibutylamine, N-(2-chloro-1,1,2-trifluoroethyl)pyrrolidine, N-(2-chloro-1,1,2-trifluoroethyl)-2'-methylpyrrolidine, N-(2-chloro-1,1,2-trifluoroethyl)-2',2'-dimethylpyrrolidine, N-(2-chloro-1,1,2-trifluoroethyl)-4'-methylpiperazine, N-(2-chloro-1,1,2-trifluoroethyl)morpholine, N-(2-chloro-1,1,2-trifluoroethyl)piperidine, and N-(2-chloro-1,1,2-trifluoroethyl)-2'-methylpiperidine, respectively.

Similarly, using the procedure of Preparation 1, but replacing trifluorochloroethylene by perfluoropropene there is obtained N-(1,1,2,3,3,3-hexafluoropropyl)diethylamine.

EXAMPLE 1

*Preparation of Methyl 18-Deoxy-18-Fluororeserpate and the Hydrochloride Thereof*

PART A.—METHYL 18-DEOXY-18-FLUORORESERPATE

A solution of 50 ml. of methylene chloride and 1 ml. (0.0246 mole) of methanol was chilled in an ice-bath and 12 ml. (0.0755 mole) of N-(2-chloro-1,1,2-trifluoroethyl) diethylamine was added. The mixture was slowly warmed to 25° C. and held at this temperature for 1 hr. before being added to a solution of 10 g. (0.0242 mole) of methyl reserpate in 400 ml. of methylene chloride. After holding the reaction mixture for 22 hrs. at 25° C., 200 ml. of ice-water was added and the aqueous layer was separated and saved. The organic layer was extracted with five 50-ml. portions of water. The combined aqueous extracts and aqueous layer was washed with 200 ml. of diethyl ether, the ether was separated and discarded, and the aqueous solution was neutralized with cold aqueous potassium hydroxide solution. The precipitate that formed was recovered on a filter and dried under reduced pressure to give 6.11 g. of a tan solid. Recrystallization of the solid from aqueous methanol yielded 3.6 g. of methyl 18-deoxy-18-fluororeserpate (as monohydrate) having a melting point of 133° to 140° C.

*Analysis.*—Calcd. for $C_{23}H_{29}FN_2O_4 \cdot H_2O$: C, 63.57; H, 7.19; F, 4.37; N, 6.45. Found: C, 63.63; H, 7.23; F, 3.92; N, 6.56.

Optical rotation:

$$[\alpha]_D^{24°} \ -66° \ (C. \ 0.482, \ chloroform)$$

Ultraviolet absorption:

$\lambda_{Max.}^{Ethanol}$ 228 m$\mu$ ($\epsilon$ 33,700); 271 m$\mu$ ($\epsilon$ 4900); 298 m$\mu$ ($\epsilon$ 6240)

Characteristic infrared absorption frequencies in mineral oil mull: 3490, 3250, 1740, 1630, 1570, 1505, 1245, 1225, 1160, 1110, 1095, 1060, 1035, 850, 795 cm.$^{-1}$.

PART B.—METHYL 18-DEOXY-18-FLUORORESERPATE HYDROCHLORIDE

A quantity of methyl 18-deoxy-18-fluororeserpate prepared as in Part A above is dissolved in ethanol and acidified with a slight excess of aqueous hydrochloric acid. The methyl 18-deoxy-18-fluororeserpate hydrochloride is recovered by evaporating the mixture to dryness under reduced pressure.

EXAMPLE 2

*Preparation of Methyl 18-Deoxy-18-Fluorodeserpidate*

Following the procedure of Example 1, Part A, but substituting methyl deserpidate for methyl reserpate, there is prepared methyl 18-deoxy-18-fluorodeserpidate.

EXAMPLE 3

*Preparation of n-Propyl 18-Deoxy-18-Fluororeserpate*

Following the procedure of Example 1, Part A, but substituting n-propyl reserpate for methyl reserpate, there is prepared n-propyl 18-deoxy-18-fluororeserpate.

EXAMPLE 4

*Preparation of sec-Butyl 18-Deoxy-18-Fluororeserpate*

Following the procedure of Example 1, Part A, but substituting sec-butyl reserpate for methyl reserpate, there is prepared sec-butyl 18-deoxy-18-fluororeserpate.

EXAMPLE 5

*Preparation of n-Octyl 18-Deoxy-18-Fluororeserpate*

Following the procedure of Example 1, Part A, but substituting n-octyl reserpate for methyl reserpate, there is prepared n-octyl 18-deoxy-18-fluororeserpate.

EXAMPLE 6

*Preparation of n-Hexyl 18-Deoxy-18-Fluorodeserpidate*

Following the procedure of Example 1, Part A, but substituting n-hexyl desirpidate for methyl reserpate, there is prepared n-hexyl 18-deoxy-18-fluorodeserpidate.

EXAMPLE 7

*Hard-Gelatin Capsule Composition*

Ten thousand two-piece hard-gelatin capsules for oral use, each capsule containing 1 mg. of methyl 18-deoxy-18-fluororeserpate, are prepared from the following ingredients:

| | G. |
|---|---|
| Methyl 18-deoxy-18-fluororeserpate | 10 |
| Cornstarch | 1600 |
| Magnesium stearate, powder | 25 |
| Talc | 160 |

The powdered ingredients are thoroughly mixed and encapsulated in the usual manner. The resulting capsules can be administered clinically at the rate of one capsule daily.

EXAMPLE 8

*Tablet Composition*

Ten thousand (10,000) scored tablets for oral use, each containing 0.25 mg. of methyl 18-deoxy-18-fluororeserpate, are prepared from the following ingredients:

| | G. |
|---|---|
| Methyl 18-deoxy-18-fluororeserpate | 2.5 |
| Lactose | 1250 |
| Sucrose, powdered | 100 |

The finely powdered materials are thoroughly mixed and granulated with 10% starch paste. The dry granules are mixed with a lubricant mixture of 100 g. of bolted starch and 20 g. of calcium stearate and then compressed into tablets. These tablets are suitable for clinical use, and are administered at the rate of 1 to 2 tablets three times daily.

I claim:

1. The process for preparing lower-alkyl 18-deoxy-18-fluororeserpates and lower-alkyl 18-deoxy-18-fluorodeserpidates which comprises reacting an acid addition salt of lower-alkyl reserpates and lower-alkyl deserpidates of the formula

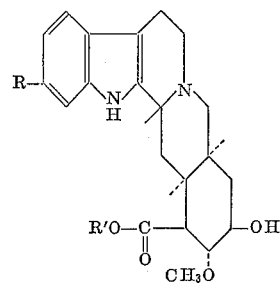

wherein R is selected from the group consisting of hydrogen and methoxy and R' is lower-alkyl with about 1.1 to 10 moles of a tertiary amine fluorinating agent of the formula

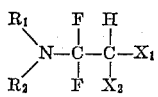

wherein $X_1$ is selected from the class consisting of chlorine and fluorine, $X_2$ is selected from the class consisting of chlorine, fluorine, and trifluoromethyl, $R_1$ and $R_2$ taken individually represent lower-alkyl, and $R_1$ and $R_2$ taken together with —N< constitute a saturated heterocyclic radical containing from 5 to 7 ring atoms, inclusive, one of which, in addition to the amino nitrogen, is selected from the group consisting of carbon, nitrogen, oxygen, and sulfur, the other ring atoms being carbon, in the presence of an inert organic solvent containing an acid catalyst whereby the 18-hydroxyl group is replaced by the fluorine atom.

2. The process for preparing lower-alkyl 18-deoxy-18-fluororeserpates by replacement of the 18-hydroxyl group with fluorine which comprises reacting a lower-alkyl reserpate acid addition salt with N-(2-chloro-1,1,2-trifluoroethyl)diethylamine in the presence of an acid catalyst and an inert organic solvent at a temperature between about —40° C. and about 50° C.

3. The process according to claim 2 wherein the acid catalyst is a hydrohalic acid.

4. The process according to claim 3 wherein the hydrohalic acid is hydrogen fluoride.

References Cited in the file of this patent
UNITED STATES PATENTS 2,809,199    MacPhillamy _____ Oct. 8, 1957

FOREIGN PATENTS

Rapp et al.: Jour. Amer. Chem. Soc., vol. 74 (1952), pages 749–753.

MacPhillamy et al.: Jour. Amer. Chem. Soc., vol. 77 (1955).

Aldrich et al.: Jour. Amer. Chem. Soc., vol. 81 (1959), p. 2481.

Robinson et al.: Jour. Amer. Cem. Soc., vol. 83 (1961), pp. 2695 and 2696.